United States Patent Office 2,795,621
Patented June 11, 1957

2,795,621
RECOVERY OF CHLORONITROBENZENES

Albert Bloom, Summit, and David E. Graham, Winfield, N. J., assignors to General Aniline & Film Corporation, New York, N. Y., a corporation of Delaware No Drawing. Application December 30, 1953, Serial No. 401,372

12 Claims. (Cl. 260—646)

This invention relates to the separation of chloronitrobenzenes and more particularly to the recovery of 3-chloronitrobenzene and 2,5-dichloronitrobenzenes from mixtures of isomeric mono- and di-chloronitrobenzenes containing them.

In accordance with the known methods for the manufacture of 3-chloronitrobenzene, as exemplified by the process published in B. I. O. S. 986, page 101, the following operations are involved:

(1) Chlorination of nitrobenzenes with sufficient chlorine to produce a crude chlorination mixture containing unchlorinated nitrobenzene, 3-chloronitrobenzene, isomeric mono (2-, and 4-) chloronitrobenzenes and dichloronitrobenzenes, the 3-chloronitrobenzene being the major and desired constituent.

(2) Fractional distillation of the crude chlorination mixture to produce a crude 3-chloronitrobenzene distillate fraction (after a forerun to remove unchlorinated nitrobenzene) and a still residue containing 2-, and 4-chloronitrobenzenes, 2,5-dichloronitrobenzene, isomeric dichloronitrobenzenes and a small amount of 3-chloronitrobenzene, the largest constituent being the 2,5-dichloronitrobenzene.

(3) Fractional freezing or "sweating" of the crude 3-chloronitrobenzene distillate fraction at temperatures up to about 40° C. to obtain a pure 3-chloronitrobenzene residue and drip oils comprising a major proportion of 3-chloronitrobenzene and the balance of isomeric monochloronitrobenzenes.

In the fractional distillation operation, an efficient column (20 to 30 or more theoretical plates) must be used to separate the crude 3-chloronitrobenzene from its impurities which would, if carried through, drastically lower the yield of pure compound. In addition, the eutectic mixtures obtained as drip oil by-products from the fractional freezing operation are extremely difficult to separate by fractional distillation. In order to obtain a product of a higher degree of purity, it is accordingly necessary to use elaborate and expensive distillation and freezing equipment.

It is an object of this invention to provide methods for producing a pure 3-chloronitrobenzene in higher yields and/or which do not require the use of an expensive fractionating column and/or expensive fractional freezing equipment. It is another object of this invention to provide methods for the production of a pure 2,5-dichloronitrobenzene which do not require the use of expensive and elaborate fractional distillation equipment. Other objects and advantages of this invention will appear as the description proceeds.

The attainment of the above objects is made possible by our discovery that when mixtures containing isomeric mono- and dichloronitrobenzenes are subjected to sulfonation with oleum, 2-chloronitrobenzene and 4-chloronitrobenze are preferentially sulfonated, which water-soluble sulfonated compounds are easily separated from the mixtures by treatment with water. The fact that 2-chloronitrobenzene and 4-chloronintrobenzene are preferentially sulfonated under the conditions involved was indeed surprising and unexpected. According to Fischer, Ber. 24, 3185 (1895), when a mixture of 2-chloronitrobenzene and 4-chloronitrobenzene is sulfonated, the 2-chloronitrobenzene is sulfonated while the 4-chloronitrobenzene is unchanged, whereby the two compounds are stated to be easily separable. According to U. S. Patent No. 1,759,554, when a mixture of 3-chloro-2-methyl-nitrobenzene and 3-chloro-6-methyl-nitrobenzene is subjected to sulfonation, the 3-chloro-2-methyl-nitrobenzene is sulfonated whereby it is easily separated with water from the unfulfonated 3-chloro-6-methyl-nitrobenzene. It was accordingly quite surprising to find that, contrary to the implications and teachings of the aforementioned references, when mixtures containing 2-chloronitrobenzene, 3-chloronitrobenzene, 4-chloronitrobenzene and isomeric dichloronitrobenzenes are subjected to sulfonation, the 2-chloronitrobenzene and 4-chloronitrobenzene are preferentially sulfonated while the 3-chloronitrobenzene remains unsulfonated, whereby their separation is easily achieved by means of treatment with water.

Stated broadly, the instant invention comprises a process for separating 2- and 4-chloronitrobenzenes from a mixture of isomeric chlorinated nitrobenzenes containing them by subjecting said mixture to sulfonation with oleum and then separating the water-soluble sulfonated 2- and 4-chloronitrobenzenes from the mixture by treatment with water. The unsulfonated constituents comprising 3-chloronitrobenzene and/or 2,5-dichloronitrobenzene may then be worked up by fractional distillation and/or fractional freezing of the like to recover them in pure form.

The sulfonation in accordance with the instant invention is conducted in a well known manner by means of oleum of from 1 to 30 percent or more strength (free $SO_3$). The temperatures maintained during sulfonation may range from about 40 to 120° C. although temperatures of from 70 to 95° C. are preferred. The weight ratio of the oleum to the mixture containing the chlorinated nitrobenzenes will of course vary in accordance with the concentration of oleum employed and the proportion of 2- and 4-chloronitrobenzene in the mixture and may range from about 0.5:1 to 10:1. The duration of the sulfonation will of course be dependent upon the particular proportions, concentrations and temperatures involved.

EMBODIMENT A

In accordance with this embodiment of the invention, nitrobenzene is chlorinated and the crude chlorinated nitrobenzene mixture subjected to fractional distillation in known manner to yield a crude 3-chloronitrobenzene distillate fraction (after a forerun to remove nitrobenzene) and a still residue comprising isomeric mono, and dichloronitrobenzenes, the still residue subjected to sulfonation with oleum, and the resulting water-soluble sulfonated 2-, and 4-chloronitrobenzenes separated from the residue by treatment with water. The residual unsulfonated material, consisting primarily of dichloronitrobenzenes with a little 3-chloronitrobenzene, may then be subjected to a fractional distillation to separate a distillate fraction comprising substantially pure 3-chloronitrobenzene. The still residue from the latter distillation, consisting for the most part of the dichloronitrobenzenes, may then be subjected to a fractional freezing operation at temperatures up to about 52° C. whereby a residue is obtained comprising substantially pure 2,5-dichloronitrobenzene, the isomeric dichloronitrobenzenes being removed in the drippings. In carrying out the fractional freezing operation, the mixture must be cooled to a temperature below its solidification point, the lower limit being preferably determined by the temperature at which the eutectic mixture freezes. The upper limit of the fractional freezing operation should be just below the solidification point of the compound being purified, which is about 54° C. for C. P. 2,5-dichloronitrobenzene.

The following examples, in which parts are by weight unless otherwise indicated, are illustrative of this embodiment of the invention and are not to be regarded as limitative.

Example 1

A still residue resulting from the fractional distillation of crude chlorinated nitrobenzene (to produce 3-chloronitrobenzene) was employed having the following approximate composition:

| | Percent |
|---|---|
| 3-chloronitrobenzene | 8.1 |
| o And p isomers | 29.5 |
| 2,5-dichloro-nitrobenzene | 45.6 |
| Isomeric dichloronitrobenzenes | 16.8 |

(a) 108 parts of the above mixture are added to 800 parts of fuming sulfuric acid containing 10% free SO$_3$. The solution is heated to 90° C. and held for 6 hours. It is diluted with water and the oil which separates is washed with warm water to remove acid and the sulfonated impurities. There is obtained 75 parts (59.5% of charge) of a product having a solidification point of 32.5° C. It consists primarily of the dichloronitrobenzenes with a little 3-chloronitrobenzene.

(b) 2650 parts of the oil product from (a) is subjected to fractional vacuum distillation in a glass helix packed column of 1″ I. D. and 4 ft. height having about 9 theoretical plate efficiency to remove 3-chloronitrobenzene. A first fraction of 265 parts of 3-chloronitrobenzene of S. P. (solidification point) 42° C. (95% purity) is obtained. A second small fraction is removed as the S. P. falls, then rises again to about 30° C. The still residue consists of 2265 parts (85.5% of charge) of the dichloronitrobenzenes and has an S. P. of 39 to 40° C.

(c) 2530 parts of the still residue from (b) are subjected to fractional freezing ("sweating") in a vertical tubular apparatus. (See B. I. O. S. 986 page 101 for general description of this type of operation.) The charge, liquid at 40° C., is cooled slowly to about 15° C. It is then drained and heated slowly (1° C./hour) to about 52° C. while draining the tube. The yield on this operation is increased by recycling the drippings from 40° C. to 52° C. to a subsequent operation. The tube is then heated to melt out the product. The yield (including recycling of drippings from 40° C. to 52° C.) is 1360 parts of 2,5-dichloronitrobenzene of S. P. 52.8° C. (Lit. M. P.=54.6° C.). This is 53.8% of charge. The overall yield is 32% of original charge or 70.1% of theoretical.

Example 2

A still residue resulting from the fractional distillation of crude chlorinated nitrobenzene (to produce 3-chloronitrobenzene) was employed having the following approximate composition:

| | Percent |
|---|---|
| 3-chloronitrobenzene | 7.0 |
| o And p isomers | 13.7 |
| 2,5-dichloronitrobenzene | 58.0 |
| Isomeric dichloronitrobenzenes | 21.3 |

(a) 800 parts of the above mixture are added to 1,000 parts of fuming sulfuric acid containing 20% free SO$_3$. The solution is heated one hour at 70° C. and five hours at 90° C., after which it is diluted with water and the oil which separates washed with warm water to remove acid and the sulfonated impurities. There is obtained 505 parts (75.5% of charge) of a product of S. P. 34.6° C. consisting primarily of the dichloronitrobenzes with a little 3-chloronitrobenzene.

(b) 2650 parts of the oil product from (a) is subjected to fractional vacuum distillation in a glass helix packed column of 1″ I. D. and 4 ft. height having about 9 theoretical plate efficiency. A first fraction of 160 parts of 3-chloronitrobenzene of S. P. 42° C. (95% purity) is obtained. A second small fraction is removed as the S. P. falls, then rises again to about 30° C. The still residue consists of 2370 parts (89.3% of charge) of the dichloronitrobenzenes and has an S. P. of 39 to 40° C.

(c) 2530 parts of the still residue from Example 2(b) are subjected to a fractional freezing as in Example 1(c). The yield of 1360 parts of 2,5-dichloronitrobenzene constitutes 53.8% of charge, representing an overall yield of 36.3% of original charge or 62.6% of theoretical.

EMBODIMENT B

In accordance with this embodiment of the invention, nitrobenzene is chlorinated, the crude chlorinated nitrobenzene mixture subjected to fractional distillation to yield a crude 3-chloronitrobenzene distillate fraction (after a forerun to remove nitrobenzene), the said distillate subjected to a fractional freezing at temperatures up to about 40° C. to yield a substantially pure 3-chloronitrobenzene residue and drip oils comprising mostly 3-chloronitrobenzene and the balance of isomeric monochloronitrobenzenes, in accordance with the known process, and the drip oils then subjected to sulfonation with oleum and the water-soluble sulfonate 2-, and 4-chloronitrobenzenes separated from the unsulfonated 3-chloronitrobenzene by treatment with water. In this manner a further yield of 3-chloronitrobenzene is obtained from the drip oils from the fractional freezing step of the known process. The following examples in which parts are by weight unless otherwise indicated are illustrative of this embodiment of the invention and are not to be regarded as limitative.

Example 3

(General procedure for chlorination, fractional distillation and freezing is given in B. I. O. S. 986 page 101.) A crude mixture of isomers in the drip oils resulting from a fractional freezing purification of 3-chloronitrobenzene was employed having a solidification point of about 33° C. and a composition of approximately 77% 3-chloronitrobenzene and 23% o and p isomers.

Fifty parts of this mixture is added to 190 parts of fuming sulfuric acid containing 10% free SO$_3$. The solution is heated to 85° C. and held at that temperature for 4 hours. It is then diluted with water and the oil which separates is washed with warm water to remove acid and the sulfonated isomers, then dried. There is obtained 36 parts of a yellow product which has a solidification point of 40° C. and is 3-chloronitrobenzene of 91.5% purity. This is a yield of 85% of theoretical. This product can be purified further in good yields if desired by fractional freezing and/or fractional distillation.

Figure 4

In this example, a mixture of drip oil isomers was employed containing about 70% of 3-chloronitrobenzene and 30% of o and p isomers.

Fifty parts of this mixture is added to 90 parts of fuming sulfuric acid containing 20% free SO$_3$. The solution is heated at 120° C. for 3 hours, diluted with water and the oil which separates washed with warm water to remove acid and the sulfonated isomers, then dried. There is obtained 32 parts of 3-chloronitrobenzene, S. P. 39.5° C. purity 90.5%, which is a yield of 82.5% of theoretical.

The purified products of this invention are useful as intermediates in the production of improved dyestuffs, herbicides, pharmaceuticals and the like.

While this invention has been described with respect to certain preferred embodiments thereof, various modifications and variations within the spirit and scope of this invention will be obvious to those skilled in the art. It is accordingly to be understood that such modifications and variations are included within the purview of this application and the scope of the appended claims.

We claim:
1. A process for separating 2- and 4-chloronitrobenzenes from a mixture consisting essentially of 2-, and 4-chloronitrobenzenes and 2,5-dichloronitrobenzene comprising subjecting said mixture to treatment with oleum to preferentially sulfonate the 2- and 4-chloronitrobenzenes and then separating the water-soluble sulfonated 2-, and 4-chloronitrobenzenes from the unsulfonated 2,5-dichloronitrobenzene by treating the mixture with water.

2. In a process for producing chloronitrobenzene isomers comprising chlorinating nitrobenzene, subjecting the resulting crude chlorination mixture to a forerun to remove nitrobenzene and to fractional distillation to yield a crude 3-chloronitrobenzene distillate fraction and a still residue consisting essentially of isomeric mono-, and dichloronitrobenzenes, the improvement comprising subjecting said still reside to treatment with oleum to preferentially sulfonate the 2- and 4-chloronitrobenzenes and then separating the water-soluble sulfonated 2-, and 4-chloronitrobenzenes from the residue by treatment with water.

3. In a process for producing chloronitrobenzene isomers comprising chlorinating nitrobenzene, subjecting the resulting crude chlorination mixture to a forerun to remove nitrobenzene and to fractional distillation to yield a crude-3-chloronitrobenzene distillate fraction and a still residue consisting essentially of isomeric mono-, and dichloronitrobenzenes, the improvement comprising subjecting said still residue to treatment with oleum to preferentially sulfonate the 2- and 4-chloronitrobenzenes, separating the water-soluble sulfonated 2-, and 4-chloronitrobenzenes from the residue by treatment with water, and then subjecting the residue containing the unsulfonated 3-chloronitrobenzene and dichloronitrobenzenes to a fractional distillation to separate a distillate fraction consisting essentially of substantially pure 3-chloronitrobenzene.

4. In a process for producing chloronitrobenzene isomers comprising chlorinating nitrobenzene, subjecting the resulting crude chlorination mixture to a forerun to remove nitrobenzene and to fractional distillation to yield a crude 3-chloronitrobenzene distillate fraction and a still residue consisting essentially of isomeric mono- and dichloronitrobenzenes, the improvement comprising subjecting said still residue to treatment with oleum to preferentially sulfonate the 2- and 4-chloronitrobenzenes, separating the water-soluble sulfonated 2- and 4-chloronitrobenzenes from the residue by treatment with water, subjecting the residue containing the unsulfonated 3-chloronitrobenzene and dichloronitrobenzenes to a fractional distillation to separate a distillate fraction consisting essentially of substantially pure 3-chloronitrobenzene and a still residue consisting essentially of dichloronitrobenzenes, and then subjecting the latter still residue to fractional freezing at temperatures up to about 52° C. to recover a residue consisting essentially of substantially pure 2,5-dichloronitrobenzene.

5. In a process for producing chloronitrobenzene isomers comprising chlorinating nitrobenzene, subjecting the resulting crude chlorination mixture to a forerun to remove nitrobenzene and to fractional distillation to yield a crude 3-chloronitrobenzene distillate fraction, and subjecting said distillate fraction to a fractional freezing at temperatures up to about 40° C. to yield a substantially pure 3-chloronitrobenzene residue and drip oils consisting essentially of isomeric mono-chloronitrobenzenes, the improvement comprising subjecting said drip oils to treatment with oleum to preferentially sulfonate the 2- and 4-chloronitrobenzenes and separating the water-soluble sulfonated 2-, and 4-chloronitrobenzenes from the unsulfonated 3-chloronitrobenzene by treatment with water.

6. In the process of producing pure 3-chloronitrobenzenes by chlorinating nitrobenzene, subjecting the resulting crude chlorination mixture to a forerun to remove nitrobenzene and to fractional distillation to separate a crude 3-chloronitrobenzene distillate fraction and a still residue consisting essentially of isomeric mono- and di-chloronitrobenzenes, and subjecting said distillate fraction to a fractional freezing at temperatures up to about 40° C. to produce a residue of substantially pure 3-chloronitrobenzene and drip oils consisting of essentially isomeric mono-chloronitrobenzenes, the improvement comprising subjecting the compositions obtained at any stage of the process subsequent to the forerun step to treatment with oleum to preferentially sulfonate the 2- and 4-chloronitrobenzenes and separating the water-soluble sulfonated 2- and 4-chloronitrobenzenes from the compositions by treatment with water.

7. A process as defined in claim 1 wherein said oleum contains about 10 to 20% of free $SO_3$.

8. A process as defined in claim 2 wherein said oleum contains about 10 to 20% of free $SO_3$.

9. A process as defined in claim 3 wherein said oleum contains about 10 to 20% of free $SO_3$.

10. A process as defined in claim 4 wherein said oleum contains about 10 to 20% of free $SO_3$.

11. A process as defined in claim 5 wherein said oleum contains about 10 to 20% of free $SO_3$.

12. A process as defined in claim 6 wherein said oleum contains about 10 to 20% of free $SO_3$.

References Cited in the file of this patent
UNITED STATES PATENTS

| | | |
|---|---|---|
| 1,759,554 | Henle et al. | May 20, 1930 |
| 2,523,707 | Miller | Sept. 26, 1950 |

OTHER REFERENCES

Hickinbottom: "Reaction of Org. Compounds," Longmans, Green & Co., New York, N. Y., 2nd ed. (1948); p. 60.

Lisk: Industrial and Engineering Chemistry, 41, 1923 (1949); p. 1926 relied on.

Gilbert et al.: Industrial and Engineering Chemistry, 43, 2022 (1951); pp. 2033–2034 relied on.